United States Patent [19]
Vaughan

[11] Patent Number: 5,258,109
[45] Date of Patent: Nov. 2, 1993

[54] ELECTRODIALYTIC CONVERSION OF COMPLEXES AND SALTS OF METAL CATIONS

[76] Inventor: Daniel J. Vaughan, 36 Paxon Dr., Wilmington, Del. 19803

[21] Appl. No.: 677,524

[22] Filed: Mar. 29, 1991

[51] Int. Cl.$^5$ ................................................. C25C 1/00
[52] U.S. Cl. ..................... 204/151; 204/152; 204/182.4; 204/301
[58] Field of Search ............ 204/151, 182.4, 152, 204/301

[56] References Cited
U.S. PATENT DOCUMENTS 3,926,759 12/1975 Horn et al. .................. 204/182.4
4,149,946 4/1979 Burke .......................... 204/182.4
4,566,956 1/1986 Cipriano ........................ 204/72

*Primary Examiner*—John Niebling
*Assistant Examiner*—Arun S. Phasge

[57] ABSTRACT

Complexes and salts of metal cations and acid anions are electrodialytically converted into insoluble hydroxides of the metal cations and acids of the anions. The conversion is effected without the electrotransport of metal cations by insolubilizing the metal cations with hydroxyl ions formed in a catholyte separated by a cation permeable membrane from an anolyte and converting anions of alkali salts formed in the catholyte to acids in the anolyte. The process comprises (a) feeding a solution of a metal complex or salt to a catholyte containing alkali cations; (b) forming hydroxyl ions in the catholyte to form insoluble metal hydroxides and alkali salts of acid anions; (c) separating the insoluble hydroxide from the catholyte; (d) feeding the separated catholyte to the anolyte whereby alkali cations are electrotransported from the anolyte to the catholyte.

23 Claims, 2 Drawing Sheets

ELECTRODIALYTIC CONVERSION OF COMPLEXES AND SALTS OF METAL CATIONS

FIELD OF THE INVENTION

This invention relates to an electrodialytic process for converting acidic solutions containing complexes or salts of metal cations into insoluble hydroxides of the metal cations and acids of the anions of the complex or salt. More specifically, this invention relates to an electrodialytic process wherein: (1) an acidic solution containing a complex or salt of a metal cation is continuously fed to the catholyte of an electrodialytic process; (2) the catholyte is separated by a cation permeable membrane from an anolyte; (3) the pH of the catholyte is controlled by hydroxyl ions formed at the cell cathode to insolubilize the metal cation and to convert anions to soluble alkali salts; (4) the insoluble metal cations are separated from the catholyte; (5) the solution of alkali salts is fed to the anolyte and the salt anions converted to acids; and (6) the alkali cations are returned to the catholyte. The process is especially useful for continuously reforming with electricity solutions of acids, such as nitric and hydrofluoric, that form complexes with metal cations when pickling stainless steel and titanium and other metals.

BACKGROUND OF THE INVENTION

The need to reform and reuse solutions of acids continues to increase with efforts to protect the environment and to conserve resources. Thousands of tons of acids are made and used annually. These acids after use are generally neutralized with caustic and lime and the soluble salts are discharged into water resources. Prior electrodialytic processes, see U.S. Pat. No. 4,636,288, provide a satisfactory method for reforming acidic solutions containing multivalent metal salts. These processes comprise electrotransporting multivalent metal cations from an acidic solution through a cation permeable membrane and insolubilizing the metal cation. The electrotransported metal cation is replaced by hydrogen ions to form an acid of the salt anions. Unfortunately, metal cations form complexes with anions that have no electrical charge or have a negative charge and the metal cation of the complex cannot be electrotransported from the acidic solution through a cation permeable membrane and the anions formed into acids. There are also problems in the prior art processes of electrotransporting metal cations through cation permeable membranes. Multivalent cations form insoluble salts in membranes or on the surface of membranes that reduce or preclude the electrotransport of cations. There are few commercial solutions that have no calcium or other metal cations and most solutions contain cations of two or more metals and anions of two or more acids. It is an object of the instant invention to provide an electrodialytic process that does not require electrotransport of metal cations that is suitable for reforming solutions of acids which contain metal complexes and/or salts of metal cations whereby the acids can be used again and again.

Electrodialysis is a well-know art (See U.S. Pat. Nos. 4,636,288; 4,325,792; 4,439,293, the disclosures of which are hereby incorporated by reference.) Electrodialysis is the transport of ions through ion permeable membranes as the result of an electrical driving force. The process is commonly carried out in an electrodialytic cell having an anolyte compartment containing an anolyte and an anode separated by an ion permeable membrane from a catholyte compartment containing a catholyte and a cathode. The ion permeable membrane can be permeable to cations or anions. The anion permeable membrane usually has fixed positive charges and, as the name implies, is permeable to anions and relatively impermeable to cations. The cation permeable membrane usually has fixed negative charges and is permeable to cations. The electron transfer reactions at the electrodes upset the equivalence of positive and negative ions which causes current to flow through the cell. Oxidation reactions occur at the cell anode and reduction reactions occur at the cell cathode. Water is oxidized to hydrogen ions and oxygen at the cell anode and water is reduced to hydroxyl ions and hydrogen at the cell cathode.

There are many complexes of metal cations (See Inorganic Chemistry, Fritz Ephraim, Fifth Edition by R. C. L. Throne and E. R. Roberts.) The complexes can be defined as substances formed by the combination of components which are already saturated according to the classical concepts of valency. The coordination number is commonly six and the complex is not an ion, but is an electrically neutral compound. There are no known groups which definitely confer a positive charge on a complex of a metal cation. There are, however, substances which can cause an increase in the negative valency and complexes can have a negative charge.

When metals are etched, electropolished, brightdipped or pickled with acids, such as phosphoric and hydrofluoric, a mixture of complexes and salts of metal cations are formed in the acid or mixtures of acids. The increasing need to protect the environment and to conserve resources make the reuse of the acids and metals desirable. These acidic solutions usually contain two or more acids, two or more metal cations and a mixture of complexes and salts of metal cations and anions of the acids. It is possible to partially reform the acids using electrodialysis (See U.S. Pat. No. 4,636,288.) by removing the metal cations of the salts. However, the anions associated with the metal complex are not reformed and in reuse the concentration of the metal complex increases in the mixture of acids and, at some point, the solution of acids must be replaced or the metal complexes removed. The concentrations of acids and the level of salts and complexes permissible in the acids vary widely in the many finishing processes for metals. These complexities essentially preclude partial reformation of the acids in commercial processes. It is an object of the present invention to provide a process suitable for reforming acids and mixtures of acids in aqueous solutions containing complexes of metal cations or salts of metal cations and mixtures of complexes and salts of cations of one or more metals.

SUMMARY OF THE INVENTION

An electrodialytic process is provided for reforming solutions of acids that contain complexes and salts of metal cations. The process comprises: (1) continuously feeding an acidic solution containing a complex or salt of a metal cation to a catholyte separated by a cation permeable membrane from an anolyte of an electrodialytic process; (2) forming hydroxyl ions in the catholyte and controlling the pH of the catholyte so that metal cations are insolubilized and anions converted to soluble alkali salts; (3) separating the metal hydroxides from the solution of alkali salts; and (4) feeding the separated solution of alkali salts to the anolyte of the process whereby the salt anions are converted to acids in the anolyte and the alkali cations are electrotransported to the catholyte. Solutions of acids, such as phosphoric acid, nitric acid and nitric-hydrofluoric acids, used to pickle, etch and bright dip stainless steel, titanium and other metals can be continuously reformed in the electrodialytic process of this invention.

BRIEF DESCRIPTION OF THE DRAWING

FIG. 1A showing a cell containing a single cation permeable membrane in compartment 2, FIG. 1B showing a cell containing two cation permeable membranes in compartment 2;

FIG. 1C showing a cell containing an anion permeable membrane and a cation permeable membrane in compartment 2 and FIG. 1D showing a cell containing two cation permeable membranes surrounding a single anion permeable membrane in compartment 2.

DETAILED DESCRIPTION OF THE INVENTION

Figure 1A:
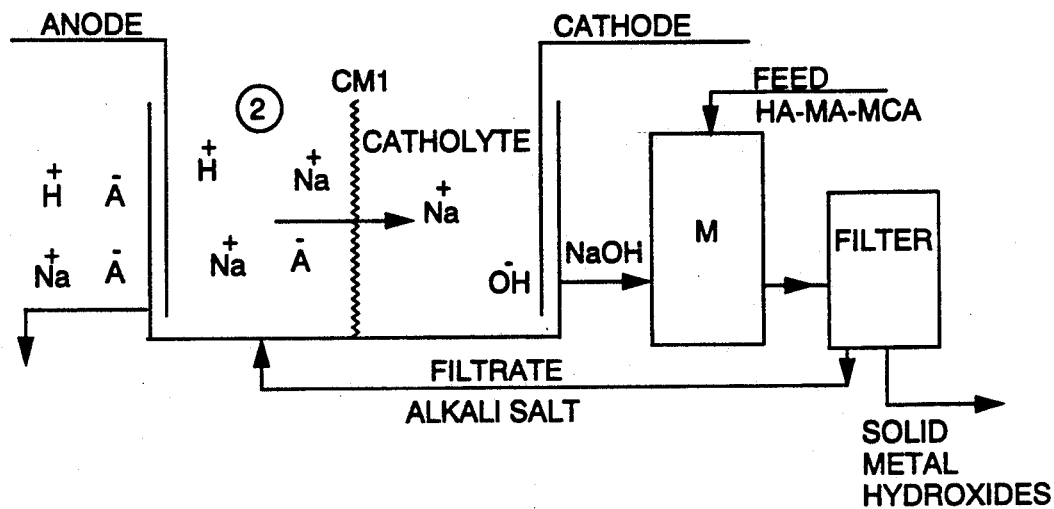
FIGS. 1A, 1B, 1C, and 1D are schematic representations of the electrodialytic cells used in the process of this invention.
Figure 1B:
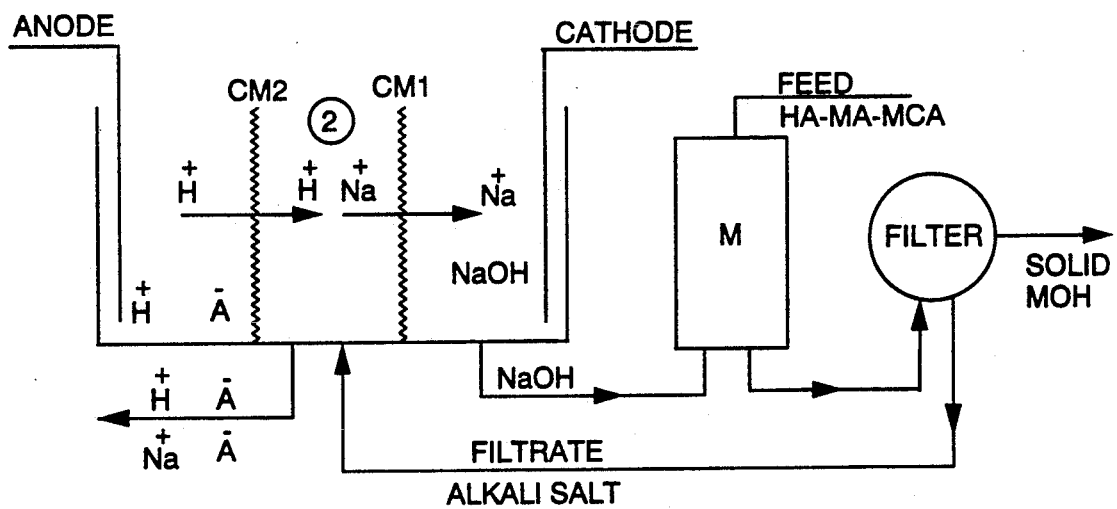
Figure 1C:
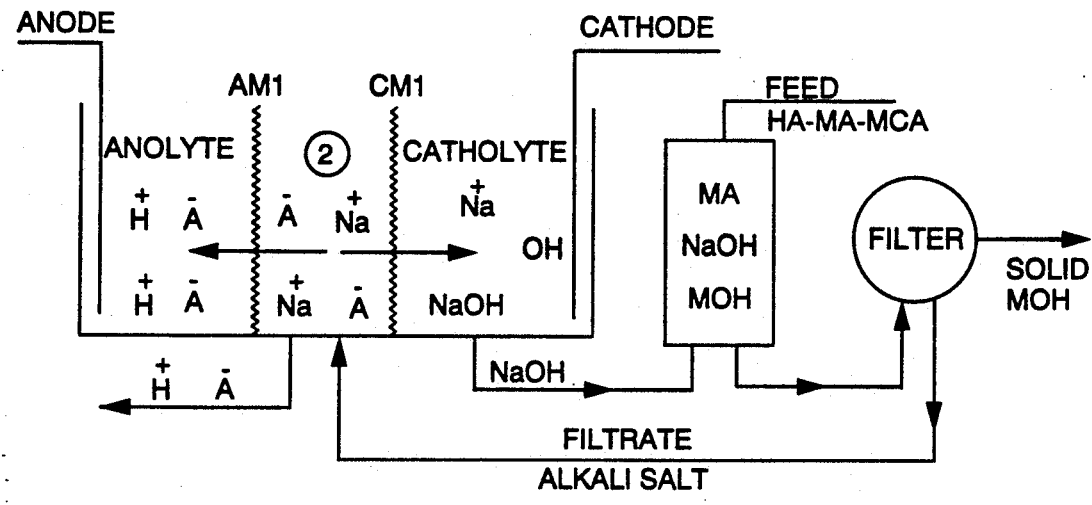
Figure 1D:
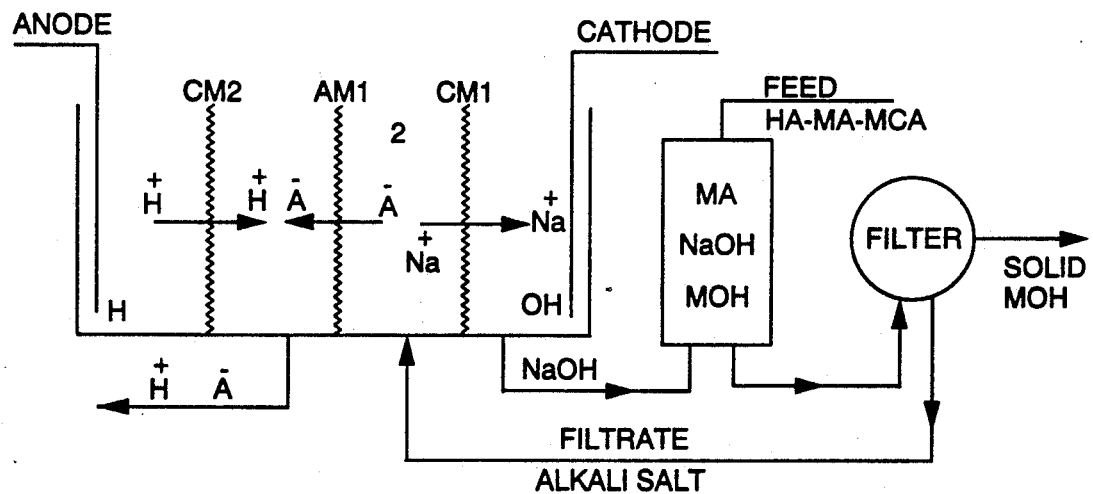

The process of the instant invention comprises feeding an etchant containing a metal complex or metal salt to the catholyte of an electrodialytic process and effecting insolubilization of the metal cation at a controlled pH. The pH being controlled by the formation of hydroxyl ions at the cell cathode or the rate etchant is fed to the catholyte. The insolubilized metal hydroxides are separated from the catholyte and the filtered catholyte fed to a compartment, compartment 2, of an electrodialytic cell that is separated by a cation permeable membrane from the catholyte. See FIG. 1. The compartment 2 can be the anolyte compartment containing an anode or compartment 2 can be a compartment between the anolyte and catholyte compartments. When an electric current is passed through the cell, see FIG. 1A, alkali cations are electrotransported from compartment 2 through cation permeable membrane CM1 into the catholyte compartment and returned to compartment 2 with the filtered catholyte. Hydrogen ions formed at the cell anode replace the alkali cations electrotransported from compartment 2 to form acids in compartment 2 with the anions. The mode of operation in 1A effects insolubilization of metal cations at the lowest pH required and minimizes the potential for fouling of cation membrane CM1 with multivalent metal cations since the catholyte contains a salt of an acid. See U.S. Pat. No. 4,636,288. A preferred arrangement of compartment 2 of the process shown in FIG. 1A is that the compartment consists of a stack of cation permeable membranes or porous separators to effect a multi-stage conversion of the alkali salts. The effluent from compartment 2 comprising the reformed etchant is returned for use. The process of FIG. 1A is suitable for reforming acidic solutions of metal salts or metal complexes and mixtures that do not contain fluoride ions sufficient in concentration to attack the cell anode or chloride ions, if it is not desirable to oxidize the chloride to chlorine at the cell anode. To reform etchants containing fluoride and chloride, it is preferable to add a third compartment, compartment 3, to the electrochemical cell. Compartment 3, as shown in FIG. 1B, is the anolyte compartment that is separated from compartment 2 by cation permeable membrane CM2. The anolyte is preferably a dilute solution of an acid of the etchant that does not contain chloride or fluoride. Cation permeable membrane CM2 limits the migration of fluoride or chloride from compartment 2 and provides for transport of hydrogen ions into compartment 2 to replace alkali cations and to form acids. When a pure acid, essentially no alkali cations, is required for use, the process of the instant invention is preferably carried out as shown in FIG. 1C and 1D. Compartment 2, FIG. 1C, is separated from compartment 3 by an anion permeable membrane and compartment 3 is the anolyte compartment. The filtered catholyte is fed to compartment 2 whereby anions are transported to the anolyte compartment 3 and alkali cations to the catholyte. When the etchant contains fluoride or chloride, a fourth compartment, compartment 4, is added to the cell as shown in FIG. 1D. Compartment 4 is the anolyte compartment and is separated by cation permeable membrane CM3 from compartment 3 containing the etchant acids. In electrolysis, hydrogen ions formed in compartment 4 at the cell anode are transported through membrane CM3 into compartment 3 to form acids with the anion electrotransported from compartment 2. Alkali cations are electrotransported from compartment 2 through membrane CM1 into the catholyte and returned to compartment 2 with the filtered catholyte. The anolyte in compartment 4 is preferably a dilute solution of an acid in the etchant that does not contain fluoride or chloride. It will become apparent to one skilled in the art that the acidic etchant solution containing a metal complex or metal salt could be fed to a compartment other than the catholyte compartment of the electrodialytic cell and that the pH of the electrolyte in the compartment could be controlled by the addition of alkali hydroxide to effect insolubilization of metal cations and the filtered electrolyte fed to another compartment in the cell. In this mode of operation it would be preferable to use alkali hydroxide from the catholyte compartment and reform the alkali hydroxide in the catholyte compartment. It will also become apparent that porous separators and bipolar membranes could be used to separate compartments of the electrodialytic cells of the process of the instant invention whereby metal cations are insolubilized with hydroxyl ions formed at the cell cathodes and anions of salts and metal complexes are converted to acids by hydrogen ions formed at the cell anode provided that the catholyte compartment is separated from other cell compartments by a cation permeable membrane.

The pH at which a metal cation of a salt and a metal cation of a complex react with hydroxyl ions to form insoluble hydroxides is approximately the same. The pH varies with the metal cation and the anions of the salt or complex. However, the approximate pH for cations is: Mg 10.5, Mn$^{++}$8.8, Nd 7.0, Zn$^{++}$7.1, Co$^{++}$6.8, Ni$^+$6.7, Pb 6.7, Fe$^+$5.7, Cu$^{++}$5.5, Cr$^{+++}$5.3, Al$^{+++}$4.1, Sn$^{++}$2.0, Fe$^{+++}$2.0, Ti$^{+++}$2.0. When the pH is equal or higher than the pH where multivalent metals form precipitates, metal complexes and metal salts are converted to insoluble hydroxides and alkali salts or mixtures of acids and alkali salts. The pH of the catholyte or feed electrolyte can be controlled to selectively insolubilize multivalent metal cations; however, this increases the potential for fouling the cation permeable membrane separating the catholyte compartment from the anolyte or other compartments and electrodepositing metals on the cell cathode. It is preferable to control the pH of the catholyte to insolublize all electrodepositable metal cations and more preferably all multivalent metal cations.

The feed to the process of the instant invention can be any solution comprising an acid or mixture of acids and a metal cation of a complex or salt that reacts with hydroxyl ions at a pH of 14 or less to form a substantially insoluble hydroxide or hydrated oxide. The feed solution may contain mixtures of anions and mixtures of metal cations and alkali ions and other substances employed in the use of the acidic feed solution.

The pH of the catholyte or feed compartment, if other than the catholyte compartment, is controlled to effect insolubilization of at least one metal cation. The pH of the catholyte is preferably controlled at the lowest pH required to insolubilize all electrodepositable metal cations and more preferably all metal cations. Substances, such as, oxalate ions, filter aids, oil absorbents, may be added to the catholyte to effect insolubilization of metal cations and removal of undesired substances.

The anolyte of the process of this invention is an acidic solution of the acids in the feed solution or a solution of an acid that does not contain fluoride or chloride ions.

Any cation permeable membrane can be used to separate the catholyte compartment from other compartments of the electrochemical cells used in the process of this invention. The cation permeable membranes have fixed negative charges and are permeable to positively charged ions. The membranes are preferably membranes of hydrocarbon and halocarbon polymers containing acid and acid derivatives distributed in the polymer matrix. Particularly suitable acid polymers are hydrocarbon and halocarbon polymers containing pendant sulfonic acid groups. The membranes may be a multi-layered structure of different polymers and contain fillers, reinforcements and chemical modifiers. The preferred membranes have high electrical conductivity, are chemically stable to the process conditions and mechanically suitable for design and economical operation of the electrochemical process. The most preferred membranes are perfluorosulfonic acid membranes such as Nafion ® manufactured by E. I. duPont de Nemours & Company. The membrane separating the anode from a fluoride containing electrolyte is preferably impermeable to fluoride ion or un-ionized hydrogen fluoride.

The alkali ions of this invention are ions of the alkali metals and ammonium. The preferred alkali metals are sodium and potassium. Mixtures of alkali ions can be used in the process of this invention.

Any anion permeable membrane can be used to separate a compartment of the electrodialytic cell. These anion permeable membranes have fixed positive charges distributed in the membrane matrix and are relatively impermeable to cations. The membranes are preferably membranes of hydrocarbon and halocarbon polymers containing quaternary ammonium or tertiary amine groups. Suitable membranes are Ionac ® MA 3475 from Sybron Chemicals and Tosflex ® IE-SF 34 fluorinated membranes from TOSOH Corporation. The preferred membranes for strong caustic and oxidizing media are the perfluorinated membranes.

The compartments of the electrodialytic cells of this invention can be separated by combinations of cation, anion and bipolar membranes and porous separators, provided that the catholyte compartment is separated from other compartments by a cation permeable membrane.

Cathodes for the process of this invention may be any electrically conductive material suitably resistant to the catholyte. Such materials are iron, stainless steel, nickel, titanium with nickel coatings, reduced oxides of titanium and the like. While solid cathodes may be used, foraminous cathodes are preferred.

Anodes for the process of this invention may be any electrically conductive, electrolytically active material resistant to the anolyte. Materials such as a value metal of titanium, tantalum, or alloys thereof bearing on its surface a noble metal, a noble metal oxide, lead dioxide or other electrolytically active materials are generally preferred. The anode may be a ceramic of reduced oxides of titanium such as Ebonex ® from Ebonex Technologies. The anodes may be solid but foraminous or rod anodes are generally preferred for release of gas and high surface areas.

A preferred method for feeding the acidic solution containing a metal cation of a complex or salt is to continuously add the solution to a surge tank containing the catholyte or feed electrolyte whereby the metal cations are insolubilized and separated from the catholyte and the catholyte is circulated from a surge tank to the cathode compartment of the cell and back to the surge tank.

To illustrate the practice of the instant invention, four electrolytic cells were assembled, as illustrated in FIG. 1, having a different number of compartments separated by ion permeable membranes. The electrolysis area based on the area of one surface of one membrane in contact with an electrolyte was 45 sq. cm. or 7 sq. inches. The cell was equipped for circulating the catholyte or feed electrolyte from a holding or surge tank through a filter to the cell and back to the holding tank to effect removal of solids, the addition of feed solution (acidic solution containing metal cation) and measuring and adjusting pH of the catholyte. Electrical power was supplied by a Rapid Technologies rectifier equipped for operation at fixed voltage. Provisions were made for sampling all electrolytes and controlling the respective volumes of the electrolytes. Each experiment was run about two hours or long enough to ensure that metal cations were insolubilized and anions converted to acids.

Most of the acidic solution containing metal cations as a complex or salt were obtained from companies using the solutions commercially. No attempt was made to identify all metal complexes and to determine the composition of the complex. This invention is for the insolubilization of metal cations of complexes and salts by hydroxyl ions formed at the cell cathode and reforming the anions associated with the complexes and salts to acids in a continuous electrodialytic process wherein the catholyte is separated from another cell compartment by a cation permeable membrane. Operation of the process is readily apparent by the formation of solids in the catholyte and increasing acidity of the anolyte or the compartment containing acids formed from the anions. The solids were tested for metal cations and the filtered catholyte for metal cations that had not been insolubilized at the controlled pH of the catholyte.

EXAMPLE 1

A two compartment cell as illustrated in FIG. 1A was assembled. The anolyte and catholyte compartments were separated by a cation permeable membrane, Nafion ® 417 perfluorosulfonic acid membrane. The cathode was a mesh of titanium coated with nickel and the anode was a mesh of titanium coated with iridium oxide. The catholyte compartment was connected to a surge tank equipped with a pH sensor, conduits for circulation of the catholyte through a small filter with a crossflow membrane filter element into the catholyte compartment of the cell and back to the surge tank. Solids were periodically removed as a slurry from the filter and tested. The anolyte compartment was equipped for adding water to maintain volume and control concentration of acids. The volume of the anolyte compartment and small surge tank was 200 ml and the catholyte system 2000 ml. Motor-driven syringe pumps were used for flow.

Electrolysis was carried out at a fixed voltage and approximately 15 amperes. The catholyte system was filled with a 2 wt. % solution of sodium hydroxide and the anolyte compartment with a 0.5 wt. % solution of nitric acid. An etchant for nickel comprising 10 wt. % nitric acid and 30 g/l of nickel nitrate was fed to the catholyte, as current was passed through the cell, until the pH of the catholyte was 8.5 and then the feed rate was adjusted to maintain the pH in the range of 8.5 to 9.0. Nickel hydroxide was precipitated continuously and removed from the catholyte by filtration. The filtered catholyte was fed continuously to the anolyte. After one hour of operation, the anolyte and catholyte solutions reached essentially a steady state composition of sodium ion and hydrogen ions from the anolyte to the catholyte and return to the anolyte as the filtered catholyte. Water was evaporated from the catholyte to control concentration of salts and acids fed to the anolyte as filtered catholyte. The anolyte contained, at essentially steady state, 10 wt. % nitric and 3 wt. % sodium salt. No attempt was made to optimize the process. This example illustrates the electro-insolubilization of metal cations of salts in a catholyte of an electrochemical process and the simultaneous conversion of alkali salts to acids of the salt anions in the anolyte of the process.

All solutions were removed from the cell, the cell compartments cleaned and the anolyte compartment filled with a 5 wt. % solution of phosphoric acid and the catholyte system filled with a 5 wt. % solution of sodium hydroxide. Current was passed through the cell at 15 to 20 ampere as a used bright dip solution containing about 40 wt. % sulfuric acid and 50 wt. % phosphoric acid, 20 g/l aluminum, 3 g/l iron and 5 grams/liter of copper (a mixture of complexes and salts) was fed dropwise to the catholyte until the pH of the catholyte was 6.5 and then the catholyte was filtered, solid hydroxides removed and the filter catholyte fed to the anolyte at essentially the rate the bright dip was fed to the catholyte. After two hours of operation, the anolyte and catholyte compositions reached a steady state. The electrochemical process was continued for three (3) hours. The anolyte composition was 49 wt. % calculated as sulfuric acids and 5 wt. % sodium salts. Water was added to the catholyte and anolyte. No attempt was made to optimize the process or to establish a water transfer profile. Water was electrotransported from the anolyte to the catholyte, approximately 3.5 moles per mole of sodium and hydrogen ions and mostly returned with the filtered catholyte. Water was electrolyzed to hydroxide ions to insolubilize the metal cations and removed from the catholyte with the hydrated metal hydroxides. After about 5 hours, the system was shut down, the solution removed and the cell cleaned. The filtered hydroxides contained aluminum, iron and copper in the ratio of metals in the bright dip. This example illustrates how metal complexes and metal salts are converted to insoluble metal hydroxides and acids of anions in an electrodialytic process where the acidic solution containing the metal salts or complex is fed to the catholyte of an electrodialytic process that is separated by a cation permeable membrane from the anolyte of the process.

EXAMPLE 2

The cell of FIG. 1C was assembled by adding compartment 3, anolyte compartment, and separating compartment 3 from compartment 2 by an Ionac ® MA 3475 anion permeable membrane. Compartment 2, the feed compartment for filtered catholyte from the catholyte compartment, was equipped for controlled addition of filtered catholyte and recirculation of the electrolyte in compartment 2. Compartment 3 was equipped with water addition to control concentration of acids formed in compartment 3. The catholyte system anode and cathode were as described in Example 1. The anolyte, compartment 3, was filled with a 1 wt. % solution of nitric acid, compartment 2 with a 1 wt. % solution of nitric acid and the catholyte compartment with a 2 wt. % solution of sodium hydroxide. Current was passed through the cell at 15 amperes as an etchant comprising 10 wt. % nitric and 30 g/l of nickel nitrate (Example 1) was fed to the catholyte until the pH of the catholyte was 7.0 and maintained between 7.0 and 8.5. The filtered catholyte was fed to compartment 2 and water was added to the anolyte to maintain the anolyte at 10 to 12 wt. % nitric acid. Water was removed from compartment 2 electrolyte as required to maintain volume of the electrolyte. Nickel hydroxide was removed continuously from the catholyte and essentially pure nitric acid was formed in compartment 3 anolyte. The current was shut off after 4 hours, the solutions removed and the equipment cleaned. This example illustrates the insolubilization of multivalent metal cations and formation of solutions of acids essentially free of alkali or metal cations.

EXAMPLE 3

The cell as shown in FIG. 1D was assembled. The compartments were separated as follows: compartment 4 compartment 3, cation permeable membrane (Nafion ® 417); compartment 3-compartment 2, Ionac ® MA 3475 anion permeable membrane; compartment 2-catholyte compartment, Nafion ® 324 cation permeable membrane. The catholyte system was as in Example 1, compartment 2 as in Example 2 and compartment 4 the anolyte compartment. Compartments 4, 3 and 2 were filled with 0.5 wt. % nitric acid and compartment 1, catholyte with a 2 wt. % solution of potassium hydroxide. Electrolysis was started and maintained at 20 amperes as a used etchant containing 30 volume % nitric acid, 4 volume % hydrofluoric acid 2.5 wt. % metal complexes and salts formed in pickling stainless steel was fed to the catholyte at a rate to control the pH of the catholyte at 6.5. Metal hydroxides were removed from the catholyte by filtration and the filtered catholyte fed to compartment 2 at approximately the rate of the feed to the catholyte compartment. Anions of nitrate and fluoride were electrotransported from compartment 2 to compartment 3 and sodium and hydrogen ions from compartment 2 to the catholyte. Hydrogen ions formed in compartment 4 were electrotransported to compartment 3. At essentially steady state operation, the nitric-hydrofluoric acids in compartment 3 were 21 wt. % based on nitric, water was removed from compartment 2 as required to maintain volumes. No attempt was made to optimize membranes and operating conditions to effect a water balance or concentration of acids.

Solutions were removed from the cell compartments, the system cleaned, and the compartments filled with the following solutions: compartment 4, 2 wt. % sulfuric acid; compartment 3—2 wt. % hydrochloric acid; compartment 2—2 wt. % hydrochloric acid; catholyte compartment—3 wt. % sodium hydroxide. Electrolysis was carried out at 20 amperes while an etchant of copper containing 5 wt. % cuprous chloride, 1 wt. % cupric chloride and 2 wt. % hydrochloric acid was fed to the catholyte at a rate to maintain the catholyte at a pH of 8. Cuprous and cupric hydroxides were formed continuously in the catholyte, removed by filtration and the filtered catholyte fed to compartment 2. Chloride ions were electrotransported to compartment 3 and converted to acids by hydrogen ions from compartment 4 at steady state. The electrolyte of compartment 3 was essentially free of salts and measured 12 wt. % hydrochloric acid. Traces of chlorine were released with oxygen from compartment 4. Water was removed from compartment 2 electrolyte and added to compartment 4 electrolyte. Some sodium was lost in the hydrated copper hydroxides and replenished. Cuprous chloride is copper anion complex and cupric chloride is a salt. This example illustrates the instant process in insolubilizing metal cations of salts and complexes and the formation of an essentially pure hydrochloric acid in a continuous electrodialytic process.

I claim:

1. A process for the electrodialytic conversion of a complex or salt of a metal cation and an anion into an insoluble hydroxide of said metal cation and acids of said complex or salt anions which comprises feeding an aqueous solution containing said complex or salt to a catholyte separated by a cation permeable membrane from an anolyte of an electrodialytic cell; controlling the pH of said catholyte to insolubilize said metal cations as an insoluble hydroxide; separating said hydroxide from said catholyte; feeding said catholyte to said anolyte; and electrotransporting alkali cations from said anolyte through said cation permeable membrane into said catholyte to convert said anions to acids.

2. The process of claim 1 wherein the pH of said catholyte is controlled at greater than 2.

3. The process of claim 1 wherein the alkali cation is a cation of ammonium or an alkali metal.

4. The process of claim 1 wherein said aqueous solution is selected from solutions of complexes or salts of said metal cations and solutions comprising mixtures of said salts and complexes of said metal cations including salts of alkali cations.

5. The process of claim 1 wherein said metal cations are cations of any metal that forms an insoluble hydroxide in the pH range of 2 to 14.

6. The process of claim 1 wherein said anion is any anion of an acid that forms a soluble alkali salt.

7. A process using an electrodialytic cell for the electrolytic conversion of a complex or salt of a metal cation in an aqueous solution into an insoluble hydroxide of said metal cation and the acid of the anion of said complex or salt which comprises (a) passing an electric current through said cell having a catholyte comprising an alkali cation separated by a cation permeable membrane from an anolyte; (b) feeding said aqueous solution of a complex or salt of a metal cation to said catholyte; (c) controlling the pH of said catholyte to form an insoluble hydroxide of said metal cation; (d) separating said insolubilized metal hydroxide from said catholyte; (e) feeding said separated catholyte containing an alkali cation to said anolyte; (f) forming hydrogen ions in said anolyte; and (g) electrotransporting said alkali cation from said anolyte to said catholyte whereby said anions of said complex or salt are converted into acids.

8. The process of claim 7 wherein said metal cations are cations of any metal that forms an insoluble hydroxide at a pH greater than 2.

9. The process of claim 7 wherein said alkali cation is a cation of ammonium, or of potassium or sodium.

10. The process of claim 7 wherein said anion is an anion of an acid of sulfur, nitrogen, phosphorus or carbon that forms soluble alkali salts.

11. The process of claim 7 wherein said aqueous solution is selected from solutions comprising a complex or salt of said metal cation and solutions comprising mixtures of said salts and complexes of metal cations.

12. The process of claim 7 wherein said pH of said catholyte is greater than 2 and sufficient to insolubilize said metal cations in said aqueous solution.

13. A process for the electrodialytic conversion of a complex or salt of a metal cation into an insoluble hydroxide of said metal cation and an acid of anions of said complex of salt which comprises feeding an aqueous solution containing said complex or salt to a catholyte in a catholyte compartment separated by a cation permeable membrane from a second electrolyte in a second cell compartment of an electrodialytic cell; controlling the pH of said catholyte to insolubilize said metal cations; separating said insolubilized metal cations from said catholyte; feeding the separated catholyte to said second electrolyte; and electrotransporting alkali cations from said second electrolyte through said cation permeable membrane into said catholyte to convert said anions into acids.

14. The process of claim 13 wherein said anions in said second electrolyte are electrotransported through an anion permeable membrane into an anolyte of said cell and converted into acids in said anolyte.

15. The process of claim 13 wherein said second electrolyte is separated by a cation permeable membrane from an anolyte of said cell and hydrogen ions are electrotransported from said anolyte into said second electrolyte and alkali cations are electrotransported from said second electrolyte into said catholyte to convert anions in said second electrolyte into acids.

16. A process using an electrodialytic cell for the electrolytic conversion of a complex or salt of a metal cation in an aqueous solution into an insoluble hydroxide of said metal cation and the acid of the anion of said complex or salt which comprises (a) passing an electric current through said cell having a cathode and a catholyte comprising an alkali hydroxide in a first cell compartment separated by a cation permeable membrane from a second electrolyte in a second cell compartment separated from an anolyte and an anode in a third compartment by an ion permeable membrane; (b) feeding said aqueous solution of a complex or salt of said metal cation to said catholyte to form hydroxyl ions in said catholyte and controlling the pH of the catholyte to insolubilize said metal cation; (c) separating said insolubilized metal cation from said catholyte; (d) feeding said separated catholyte to said second electrolyte and electrotransporting alkali cations from said second electrolyte to said catholyte to convert said anions to acids in said second electrolyte or electrotransporting said alkali cations through said ion permeable membrane to said third cell compartment containing anolyte and convert anions to acids.

17. The process of claim 16 wherein said ion permeable membrane separating said second electrolyte from said anolyte is an anion permeable membrane.

18. The process of claim 16 wherein said ion permeable membrane separating said second electrolyte from said anolyte is a cation permeable membrane.

19. The process of claim 16 wherein said anolyte is an aqueous solution of an acid.

20. The process of claim 16 wherein said aqueous solution containing a complex or salt of a metal cation is selected from solutions containing complexes or salts of metal cations and solutions containing mixtures of complexes and salts of metal cations.

21. The process of claim 16 wherein said metal cations are cations of metals that form insoluble hydroxides in aqueous solution at a pH greater than 2.

22. The process of claim 16 wherein the alkali cations are cations of ammonium, potassium and sodium.

23. The process of claim 16 wherein the pH of the catholyte is greater than 2 and and sufficient to insolubilize all metal cations.

* * * * *